United States Patent
Kim et al.

(10) Patent No.: US 12,525,664 B2
(45) Date of Patent: Jan. 13, 2026

(54) BATTERY MODULE, METHOD FOR PREPARING THE SAME AND BATTERY PACK INCLUDING THE SAME

(71) Applicant: LG Energy Solution, Ltd., Seoul (KR)

(72) Inventors: Gwan Woo Kim, Daejeon (KR); Seung Ryul Baek, Daejeon (KR); Junyeob Seong, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 955 days.

(21) Appl. No.: 17/434,931

(22) PCT Filed: May 11, 2020

(86) PCT No.: PCT/KR2020/006151
§ 371 (c)(1),
(2) Date: Aug. 30, 2021

(87) PCT Pub. No.: WO2020/251173
PCT Pub. Date: Dec. 17, 2020

(65) Prior Publication Data
US 2022/0149455 A1    May 12, 2022

(30) Foreign Application Priority Data

Jun. 12, 2019 (KR) .................. 10-2019-0069230
Jan. 30, 2020 (KR) .................. 10-2020-0011329

(51) Int. Cl.
*H01M 10/653* (2014.01)
*H01M 10/625* (2014.01)
(Continued)

(52) U.S. Cl.
CPC ....... *H01M 10/653* (2015.04); *H01M 10/625* (2015.04); *H01M 10/647* (2015.04); *H01M 50/211* (2021.01); *H01M 2220/20* (2013.01)

(58) Field of Classification Search
CPC ............ H01M 10/653; H01M 10/625; H01M 10/647; H01M 50/211; H01M 2220/20;
(Continued)

(56) References Cited

U.S. PATENT DOCUMENTS 8,216,713 B2 *   7/2012  Yoon .................. H01M 10/613
                                                        429/71
2015/0044538 A1   2/2015  Katayama et al.
(Continued)

FOREIGN PATENT DOCUMENTS

EP         3486965 A1      5/2019
JP      2013258364 A     12/2013
(Continued)

OTHER PUBLICATIONS

Extended European Search Report including Written Opinion for Application No. 20822296.8 dated Mar. 21, 2022, pp. 1-6.
(Continued)

*Primary Examiner* — Matthew T Martin
*Assistant Examiner* — Bartholomew A Hornsby
(74) *Attorney, Agent, or Firm* — Lerner David LLP (57) ABSTRACT

A battery module includes a cell stack including a plurality of battery cells, and a module frame accommodating the cell stack, a bottom part of the module frame includes a first area, a second area, and a third area in which respective thermally conductive resin layers are formed, and the thermally conductive resin layers of the first area and the second area are each thicker than the thermally conductive resin layer of the third area.

14 Claims, 7 Drawing Sheets

(51) Int. Cl.
*H01M 10/647* (2014.01)
*H01M 50/211* (2021.01)

(58) Field of Classification Search
CPC ............. H01M 50/227; H01M 50/231; H01M 50/548; H01M 10/6551; H01M 50/24; H01M 50/258; H01M 10/613; H01M 50/204; H01M 50/244; H01M 50/20
See application file for complete search history.

(56) References Cited

U.S. PATENT DOCUMENTS

| | | | |
|---|---|---|---|
| 2016/0301117 A1* | 10/2016 | Tyler | H01M 10/0525 |
| 2018/0076493 A1 | 3/2018 | Park et al. | |
| 2018/0342710 A1 | 11/2018 | Yoon et al. | |
| 2019/0131596 A1 | 5/2019 | Yang et al. | |
| 2019/0157729 A1 | 5/2019 | Yamashita | |
| 2019/0198952 A1* | 6/2019 | Choi | H01M 50/271 |
| 2019/0245168 A1* | 8/2019 | Qin | H01M 50/291 |
| 2019/0280265 A1 | 9/2019 | Jansen et al. | |
| 2020/0036049 A1 | 1/2020 | Lee et al. | |
| 2020/0185797 A1 | 6/2020 | Park et al. | |
| 2020/0251789 A1 | 8/2020 | Park et al. | |

FOREIGN PATENT DOCUMENTS

| | | | |
|---|---|---|---|
| JP | 2014086342 A | 5/2014 | |
| JP | 2017228364 A | 12/2017 | |
| JP | 2018060595 A | 4/2018 | |
| JP | 2018510463 A | 4/2018 | |
| KR | 20140073636 A | 6/2014 | |
| KR | 20180128573 A | 12/2018 | |
| KR | 20190006451 A | 1/2019 | |
| KR | 20190012803 A | 2/2019 | |
| KR | 20190030673 A | 3/2019 | |
| WO | 2018022907 A1 | 2/2018 | |
| WO | 2019088625 A1 | 5/2019 | |

OTHER PUBLICATIONS

International Search Report for Application No. PCT/KR2020/006151 mailed Aug. 27, 2020, pp. 1-3.

* cited by examiner

BATTERY MODULE, METHOD FOR PREPARING THE SAME AND BATTERY PACK INCLUDING THE SAME

CROSS-REFERENCE TO RELATED APPLICATIONS

This application is a national phase entry under 35 U.S.C. § 371 of International Application No. PCT/KR2020/006151, filed May 11, 2020, published in Korean, which claims the benefit of Korean Patent Application No. 10-2019-0069230 filed on Jun. 12, 2019 and Korean Patent Application No. 10-2020-0011329 filed on Jan. 30, 2020 with the Korean Intellectual Property Office, the disclosures of which are incorporated herein by reference in their entireties.

TECHNICAL FIELD

The present disclosure relates to a battery module, a method for preparing the same, and a battery pack including the battery module, and more particularly to a method for preparing a battery module that can apply a precise amount of a thermally conductive resin, a battery module prepared through the method, and a battery pack including the battery module.

BACKGROUND ART

In modern society, as portable devices such as a mobile phone, a notebook computer, a camcorder and a digital camera has been daily used, the development of technologies in the fields related to mobile devices as described above has been activated. In addition, rechargeable batteries are used as a power source for an electric vehicle (EV), a hybrid electric vehicle (HEV), a plug-in hybrid electric vehicle (P-HEV) and the like, in an attempt to solve air pollution and the like caused by existing gasoline vehicles using fossil fuel, and therefore, there is an increasing need for development of the secondary battery.

Currently commercialized secondary batteries include a nickel cadmium battery, a nickel hydrogen battery, a nickel zinc battery, and a lithium secondary battery. Among them, the lithium secondary battery has come into the spotlight because they have advantages, for example, hardly exhibiting memory effects compared to nickel-based secondary batteries and thus being freely charged and discharged, and having very low self-discharge rate and high energy density.

Such lithium secondary battery mainly uses a lithium-based oxide and a carbonaceous material as a positive electrode active material and a negative electrode active material, respectively. The lithium secondary battery includes an electrode assembly in which a positive electrode plate and a negative electrode anode plate respectively coated with the positive electrode active material and the negative electrode active material are disposed with a separator being interposed between them, and an exterior material, i.e., battery case, which seals and accommodates the electrode assembly together with an electrolyte.

Generally, the lithium secondary battery may be classified into a can-type secondary battery in which the electrode assembly is embedded in a metal can, and a pouch-type secondary battery in which the electrode assembly is embedded in a pouch of an aluminum laminate sheet, depending on the shape of the exterior material.

In the case of a secondary battery used for a small-sized device, two to three battery cells are arranged, but in the case of a secondary battery used for a medium- to large-sized device such as an automobile, a battery pack in which a large number of battery cells are electrically connected is used. In such a battery module, a plurality of battery cells are connected to each other in series or parallel to form a cell stack, thereby improving capacity and output. In addition, one or more battery modules may be mounted together with various control and protection systems such as a battery management system (BMS) and a cooling system to form a battery pack.

Figure 1:
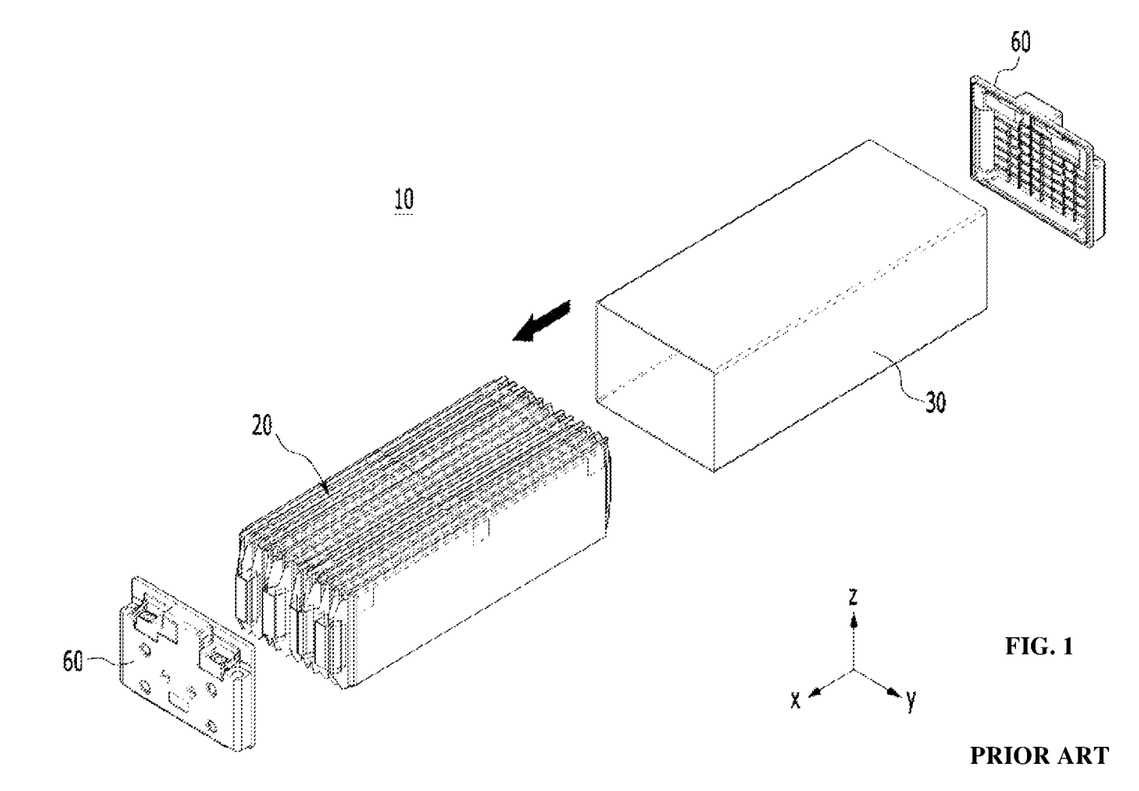
FIG. 1 is an exploded perspective view illustrating a battery module according to the related art.

FIG. 1 is an exploded perspective view illustrating a battery module 10 according to the related art.

Referring to FIG. 1, the battery module 10 may include a mono frame 30, of which a front surface and a rear surface are opened, to receive a cell stack 20 in an interior space thereof and end plates 60 covering the front surface and the rear surface of the mono frame 30.

In the mono frame 30, the cell stack 20 is horizontally assembled on the opened front surface or rear surface of the mono frame 30 along the X-axis direction like an arrow illustrated in FIG. 1 However, the height of the mono frame 30 has to be designed high in consideration of the maximum height of the cell stack 20 and a tolerance in the insertion process, and thus an unnecessarily wasted space cannot be avoided. Here, the clearance is a gap caused due to press-fitting and the like.

Meanwhile, a thermally conductive resin layer for transferring heat and fixing the cell stack may be formed between a lower portion of the cell stack 20 and the mono frame 30. Generally, after the cell stack 20 is inserted into the mono frame 30, the thermally conductive resin is inserted through an injection hole formed in the mono frame 30 to form the thermally conductive resin layer.

However, in the injection method as above, due to a tolerance of components of each battery module, it is difficult to inject a precise amount of the thermally conductive resin so that the thermally conductive resin, the amount of which is unnecessarily large, is consumed.

DETAILED DESCRIPTION OF THE INVENTION

Technical Problem

The present disclosure has been made to solve the above-mentioned problems, and an object of the present disclosure to provide a method for preparing a battery module, which can more effectively utilize an interior space and apply a precise amount of a thermally conductive resin, a battery module prepared through the method, and a battery pack including the battery module.

However, the problem to be solved by embodiments of the present disclosure is not limited to the above-described problems, and can be variously expanded within the scope of the technical idea included in the present disclosure.

Technical Solution

A battery module according to an embodiment of the present disclosure includes a cell stack including a plurality of battery cells, and a module frame accommodating the cell stack, a bottom part of the module frame includes a first area, a second area, and a third area in which respective thermally conductive resin layers are formed, and the thermally conductive resin layers of the first area and the second area are each thicker than the thermally conductive resin layer of the third area.

The first area and the second area may be located at opposite ends spaced apart from each other in the bottom part of the module frame and the third area may be located between the first area and the second area that are spaced apart from each other.

The thermally conductive resin layer of the third area may include a first thermally conductive resin layer that is adjacent to the thermally conductive resin layer of the first area, and a second thermally conductive resin layer that is adjacent to the thermally conductive resin layer of the second area, and the third area may include a thermally conductive resin-unapplied part located between the first thermally conductive resin layer and the second thermally conductive resin layer.

The battery module may further include an insulation film covering the thermally conductive resin-unapplied part.

The battery module may further include an insulation film located between at least one of the first thermally conductive resin layer and the second thermally conductive resin layer, and the bottom part.

The battery module may further include an insulation film located between the first thermally conductive resin layer and the second thermally conductive resin layer.

A front surface and a rear surface of the module frame may be opened, and the first area and the second area may be located at opposite ends of the bottom part, which are adjacent to the front surface and the rear surface, respectively.

Electrode leads of the plurality of battery cells may protrude toward the front surface and the rear surface.

The thermally conductive resin layer of the third area may include a first thermally conductive resin layer that is adjacent to the thermally conductive resin layer of the first area, and the battery module may further include an insulation film located between the first thermally conductive resin layer of the third area and the bottom part.

A stack direction of the plurality of battery cells may be parallel to the bottom part of the module frame, and each battery cell of the plurality of battery cells may contact the thermally conductive resin layer.

The module frame may have a U shape, of which an upper part is opened, and the battery module may further include an upper plate covering the cell stack in the upper part of the module frame.

The module frame may further include two side surface parts extending upwards from opposite side surfaces of the bottom part, which face each other, and a distance between the two side surface parts may be the same as a width of the upper plate.

A method for preparing a battery module according to an embodiment of the present disclosure includes a step of applying a thermally conductive resin on a bottom part of a module frame, of which an upper part is opened, to form a thermally conductive resin application layer, a step of vertically moving a cell stack including a plurality of battery cells toward the bottom part of the module frame, a step of forming a thermally conductive resin layer while the cell stack compresses the thermally conductive resin application layer, and a step of mounting an upper plate so as to cover the cell stack on the upper part of the module frame, the bottom part of the module frame includes a first area, a second area, and a third area, the thermally conductive resin is applied onto the first area and the second area in the forming of the thermally conductive resin application layer, and the thermally conductive resin applied onto the first area and the second area is moved to the third area in the forming of the thermally conductive resin layer.

The first area and the second area may be located at opposite ends spaced apart from each other in the bottom part of the module frame, and the third area may be located between the first area and the second area, which are spaced apart from each other.

A front surface and a rear surface of the module frame are opened, and the first area and the second area may be located at the opposite ends of the bottom part, which are adjacent to the front surface and the rear surface, respectively.

Electrode leads of the plurality of battery cells may protrude toward the front surface and the rear surface.

The method for preparing the battery module may further include a step of disposing an insulation film on the third area.

Advantageous Effects

According to embodiments of the present disclosure, a space in a battery module, the size of which is unnecessarily large, may be reduced by assembling a cell stack vertically with respect to a module frame to effectively utilize an interior space thereof.

Further, a thermally conductive resin layer is formed by applying a thermally conductive resin instead of through an existing injection method so that it is easy to apply only a necessary precise amount of the thermally conductive resin.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Parts that are irrelevant to the description will be omitted to clearly describe the present disclosure, and like reference numerals designate like elements throughout the specification.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity.

In the drawings, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a part is referred to as "including" or "comprising" a certain component, it means that it can further include other components, without excluding the other components, unless otherwise stated.

Figure 2:
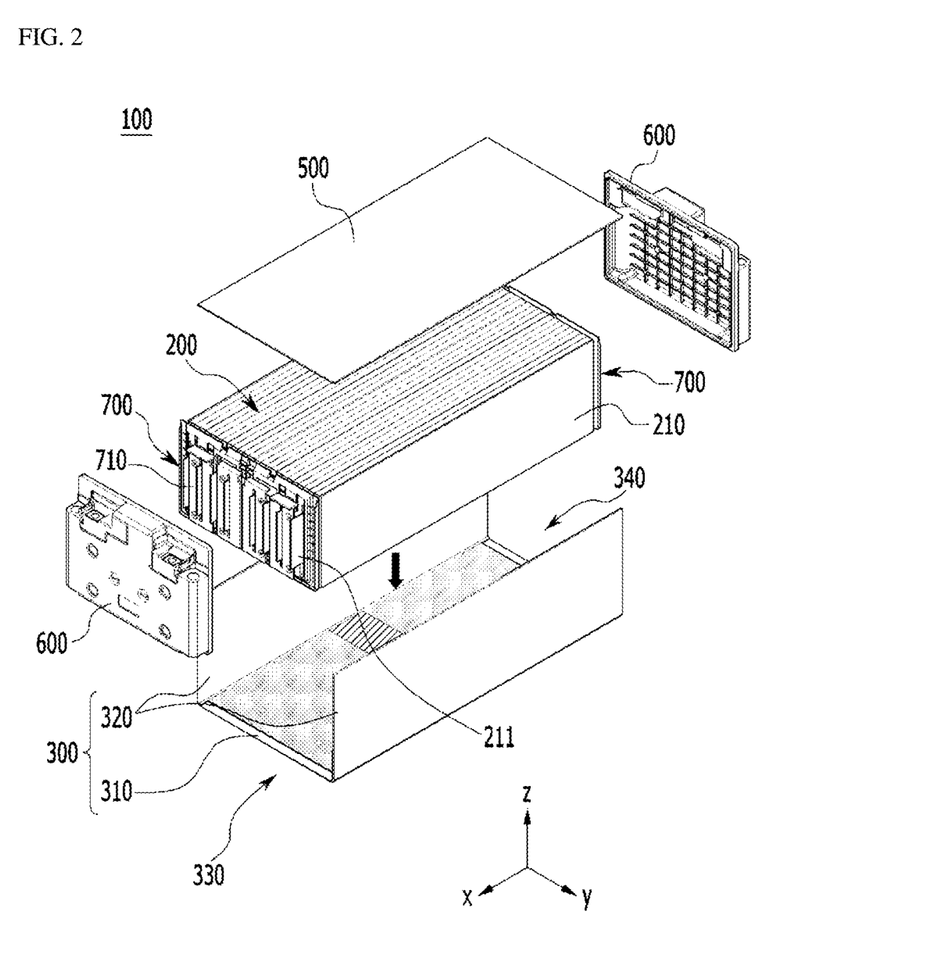
FIG. 2 is an exploded perspective view illustrating a method for preparing the battery module according to an embodiment of the present disclosure.
Figure 3:
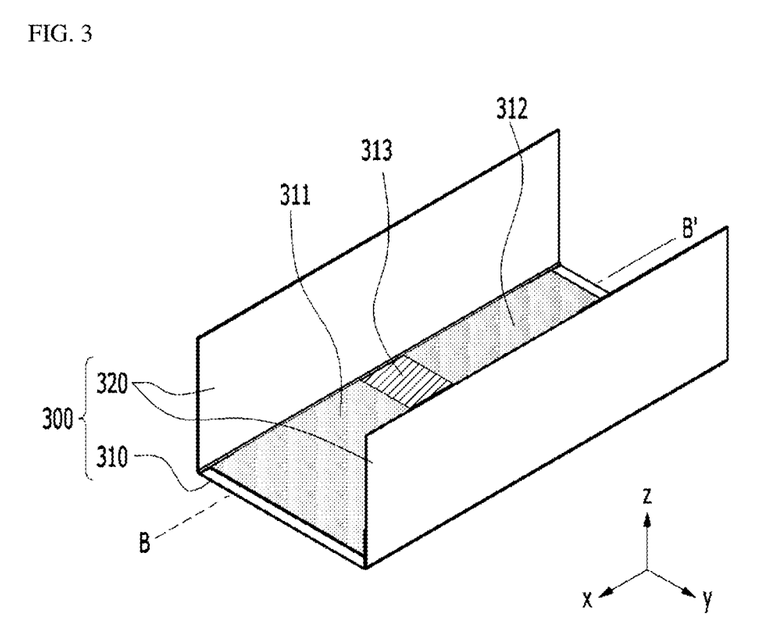
FIG. 3 is a perspective view illustrating a module frame of FIG. 2.

FIG. 2 is an exploded perspective view illustrating a battery module 100 according to an embodiment of the present disclosure and a method for preparing the same. FIG. 3 is a perspective view illustrating a module frame 300 of FIG. 2.

Referring to FIGS. 2 and 3, the battery module 100 of the present embodiment includes a cell stack 200 including a plurality of battery cells 210 and a module frame 300 accommodating the cell stack 200.

The module frame 300 may have a U shape, of which an upper part is opened, and the battery module 100 may further include an upper plate 500 covering the cell stack 200 in the upper part of the module frame 300.

The module frame 300 may include two side surface parts 320 extending upwards (in the Z-axis direction) from opposite side surfaces of the bottom part, which face each other, and may have a front surface 330 and a rear surface 340 having opened shapes. It is preferable that a distance between the two side surface parts 320 is the same as the width of the upper plate 500.

The cell stack 200 may include a plurality of the battery cells 210 stacked along a specific direction, and may further include a busbar 710 connecting an electrode lead 211 of each the battery cell 210 and a busbar frame 700, on which the busbar 710 is mounted. Then, a stack direction of the plurality of battery cells 210 may be parallel to the bottom part 310 of the module frame 300. That is, the stack direction of the plurality of battery cells 210 may be parallel to the Y-axis direction illustrated in FIG. 2.

The cell stack 200 may be mounted in the bottom part 310 of the module frame 300 so that each of the plurality of the battery cells may contact a thermally conductive resin layer applied onto the bottom part 310 of the module frame 300. The thermally conductive resin layer will be described below in detail.

Figure 4:
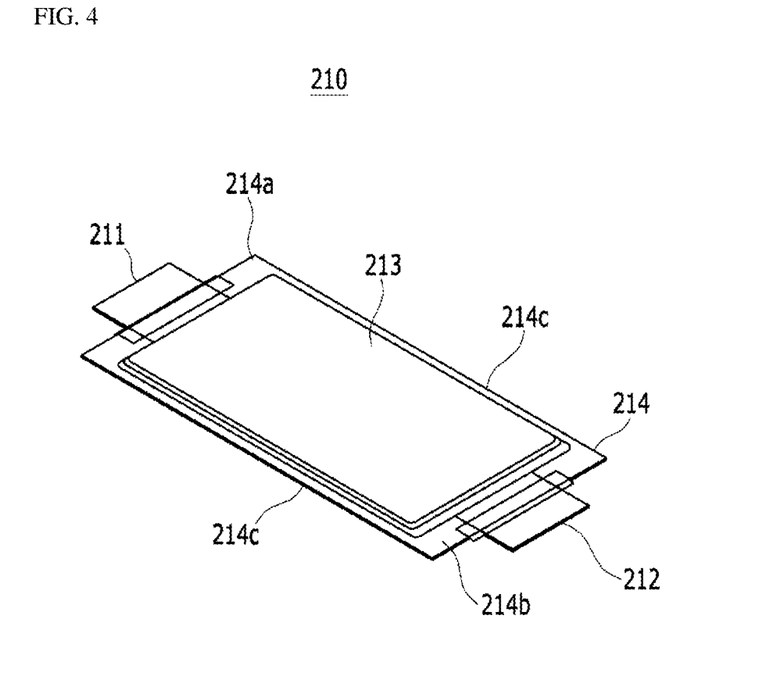
FIG. 4 is a perspective view illustrating one battery cell included in a battery cell stack of FIG. 2.

FIG. 4 is a perspective view illustrating one battery cell 210 included in the cell stack 200 of FIG. 2. Referring to FIGS. 2 and 4, the battery cell 210 according to the present embodiment has a structure in which the two electrode leads 211 and 212 that are opposite to each other protrude from one end part 214a and another one end part 214b of a battery body 213, respectively. The battery cell 210 may be prepared by bonding opposite ends 214a and 214b of a battery case 214 and opposite side surfaces 214c connecting them while receiving an electrode assembly (not illustrated) in the battery case 214. When the cell stack 200 including the battery cell 210 is mounted on the module frame 300, the electrode leads 211 and 212 may protrude toward the front surface 330 and the rear surface 340.

Meanwhile, the battery module 100 may further include end plates 600 covering the front surface 330 and the rear surface 340. The module frame 300 and the end plates 600 may be bonded to each other through a method such as welding, but the present disclosure is not limited thereto but various embodiments may be applied. Although not illustrated in detail, as a modified embodiment, the module frame may form an integrated structure while the front surface and the rear surface thereof are not opened, so that the end plates may be unnecessary structures.

Referring to FIGS. 2 and 3, a method for preparing a battery module 100 according to an embodiment of the present disclosure includes a step of applying a thermally conductive resin onto a bottom part 310 of a module frame 300, of which an upper part is opened, to form a thermally conductive resin application layer, a step of vertically moving a cell stack 200 including a plurality of battery cells 210 toward a bottom part 310 of the module frame 300, of which an upper part is opened, and a step of forming a thermally conductive resin layer while the cell stack 200 compresses the thermally conductive resin application layer.

In this case, the fact that the cell stack 200 is moved toward the bottom part 310 means that the cell stack 200 is disposed on the bottom part 310 along a direction that is opposite to the Z-axis direction like an arrow illustrated in FIG. 2.

The bottom part 310 of the module frame 300 includes a first area 311, a second area 312, and a third area 313, and a thermally conductive resin is applied to onto the first area 311 and the second area 312 in the step of forming the thermally conductive resin application layer.

The first area 311 and the second area 312 may be located at opposite ends of the bottom part 310, which are spaced apart from each other. In detail, the first area 311 and the second area 312 may be located not at ends of the bottom part 310, which are adjacent to the side surface parts 320, but at the opposite ends of the bottom part 310, which are adjacent to the opened front surface 330 and the rear surface 340, respectively. Meanwhile, the third area 313 may be located between the first area 311 and the second area 312 spaced apart from each other.

That is, although the locations of the first area 311 and the second area 312 are not particularly limited, it is preferable that the locations are located at the opposite ends of the bottom part 310, which are adjacent to the front surface 330 and the rear surface 340, respectively. This is because it is more effective in cooling the cell stack 200 to locate the first area 311 and the second area 312 in sites corresponding to the electrode lead 211 as the electrode lead 211 has a high heat value as compared with another part.

Subsequently, a step of covering the opened upper part of the module frame 300 with the upper plate 500, and covering the front surface 330 and the rear surface 340 of the module frame 300 with the end plates 600 may be continued.

As described above, it is necessary to marginally design the height of the mono frame 30 of FIG. 1 in consideration of an assembly tolerance due to horizontal insertion, but in the present embodiment, because the cell stack 200 may be vertically assembled, the height of the side surface part 320 may be set to be smaller to constitute a compacter battery module. That is, the battery module having an excellent capacity and an excellent output may be prepared.

Figure 5:
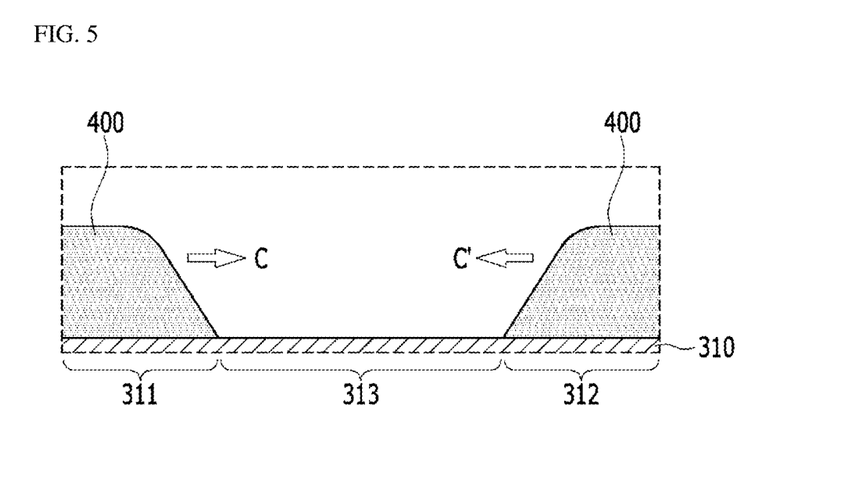
FIG. 5 is a part of a sectional view taken along cutting line B-B' of FIG. 3.

FIG. 5 illustrates a part of a sectional view taken along cutting line B-B' of FIG. 3. In particular, it illustrates that a boundary between the first area 311 and the third area 313 is in an enlarged state. Referring to FIG. 5 together with FIG. 2 again, as described above, the thermally conductive resin may be applied onto the first area 311 and the second area 312 of the bottom part 310 to form a thermally conductive resin application layer 400. Thereafter, the cell stack 200 may be moved along a vertical direction (the direction that is opposite to the Z-axis of FIG. 2) to compress the thermally conductive resin application layer 400. Accordingly, parts of the thermally conductive resin application layers 400 of the first area 311 and the second area 312 are moved to the third area 313. That is, the thermally conductive resin application layer 400 of the first area 311 located on the left side of the third area 313 is moved in direction C, and the thermally conductive resin application layer 400 of the second area 312 located on the right side of the third area 313 is moved in direction C'.

As described above, in the mono frame 30 of FIG. 1, because the thermally conductive resin is injected through an injection hole of the mono frame 30 after the cell stack 30 is inserted into the mono frame 30, an unnecessary thermally conductive resin is injected.

In the present embodiment, the thermally conductive resin may be applied in advance to prevent injection of an excessive amount of the thermally conductive resin that is not necessary as in the related art. Further, a part of the thermally conductive resin application layer 400 is moved to be filled through compression of the cell stack 200 so that it is easier to apply a precise amount of the thermally conductive resin.

Meanwhile, the thermally conductive resin of the thermally conductive resin application layer 400 may include a thermally conductive bonding substance, in detail, at least one of a silicone material, an urethane material, and an acrylic material. The thermally conductive resin is in a liquid state when being applied, but the thermally conductive resin is solidified after being applied, thereby functioning to fix the one or more battery cells 210 that constitute the cell stack 200. Further, the thermally conductive resin may rapidly transfer heat generated in the battery cell 210 to the outside of the battery module due to the excellent thermal conductivity characteristics thereof, thereby preventing overheating of the battery module.

Figure 6:
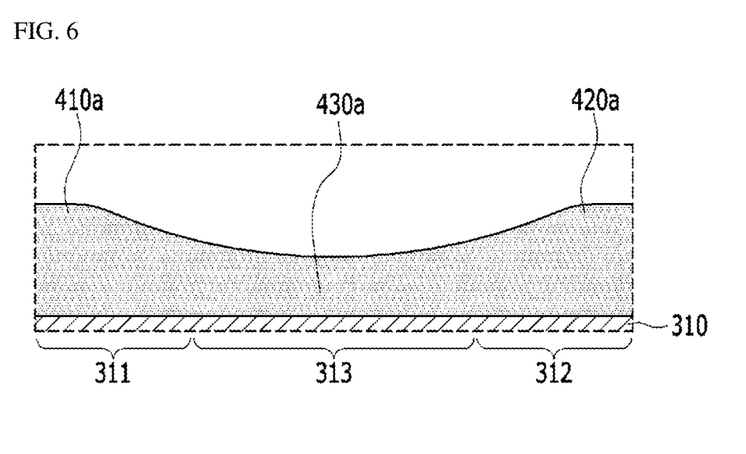
FIG. 6 is a cross-sectional view illustrating a state after the cell stack compresses the thermally conductive resin application layer.

FIG. 6 is a cross-sectional view illustrating a state after the cell stack compresses the thermally conductive resin application layer to form the thermally conductive resin layers 410a, 420a, and 430a.

That is, as the cell stack (not illustrated) is compressed, parts of the thermally conductive resin application layers 400 of the first area 311 and the second area 312 are moved to the third area 313 as illustrated in FIG. 5, so that the thermally conductive resin layer 410a of the first area 311, the thermally conductive resin layer 420a of the second area 312, and the thermally conductive resin layer 430a of the third area 313 are formed as illustrated in FIG. 6.

As described above, because the thermally conductive resin layers 410a, 420a, and 430a are formed as the thermally conductive resin is moved due to the compression, the thermally conductive resin layer 410a of the first area 311 and the thermally conductive resin layer 420a of the second area 312 may be thicker than the thermally conductive resin layer 430a of the third area 313. In more detail, as the thermally conductive resin layer 410a of the first area 311 and the thermally conductive resin layer 420a of the second area 312 are moved toward the thermally conductive resin layer 430a of the third area 313, the thickness thereof may become smaller.

Here, the thicknesses of the thermally conductive resin layers 410a, 420a, and 430a refer to the vertical length of the bottom part 310 with respect to the bottom part 310.

That is, according to an embodiment of the present disclosure, a distance between the lowest point of the thermally conductive resin layer 410a of the first area 311 and the bottom part 310 may be larger than a distance of the highest point of the thermally conductive resin layer 430a of the third area 313 and the bottom part 310. Similarly, a distance between the lowest point of the thermally conductive resin layer 420a of the second area 312 and the bottom part 310 may be larger than a distance between the highest point of the thermally conductive resin layer 430a of the third area 313 and the bottom part 310.

Figure 7:
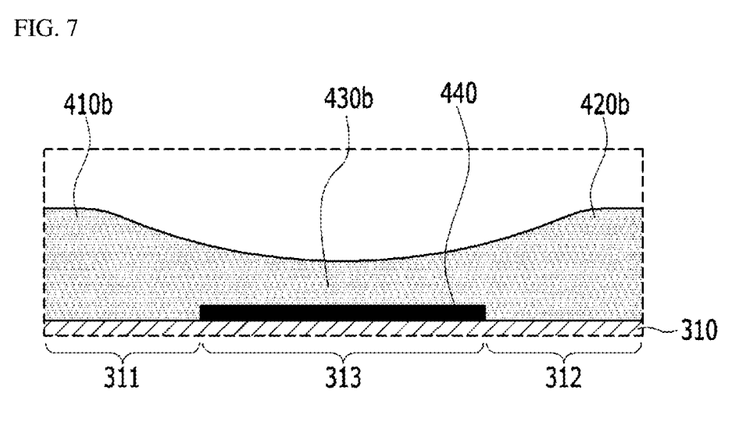
FIGS. 7 to 10 are views illustrating according to other modified embodiments of the present disclosure, respectively.

FIGS. 7 to 10 are cross-sectional views illustrating other modified embodiments of the present disclosure, respectively. First, FIG. 7 is a cross-sectional view for the battery module further including an insulation film 440.

Referring to FIG. 7, the insulation film 440 for electrical insulation may be further located between the bottom part 310 and the thermally conductive resin layer 430b of the third area 313.

That is, the insulation film 440 may be further disposed on the third area 313 of FIGS. 3 and 5, and a structure of the thermally conductive resin layers 410b, 420b, and 430b, and the insulation film 440 as illustrated in FIG. 7 may be formed while the thermally conductive resin application layers 400 applied onto the first area 311 and the second area 312 are moved to the top of the insulation film.

When a part of the thermally conductive resin is not completely applied to the third area 313, the insulation film 440 prevents a current from flowing between the battery cell (not illustrated) and the bottom part 310 through the part, and the shape and the material thereof are not limited as long as it is an electrically insulating thin film.

Figure 8:
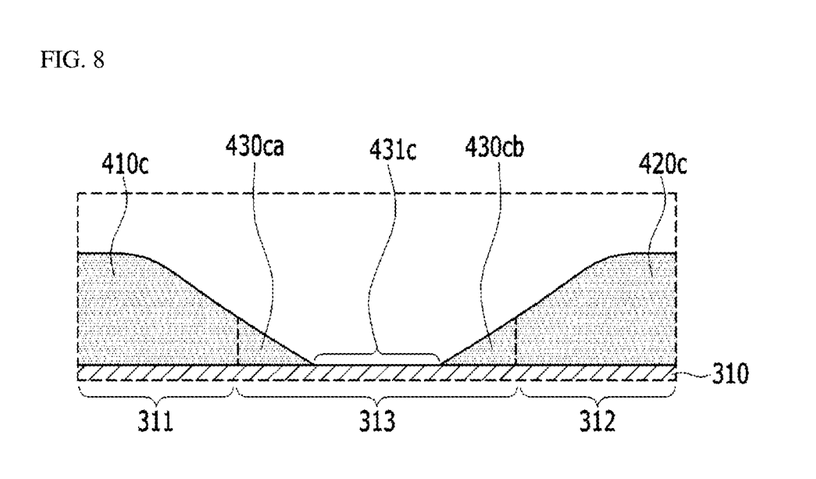

Next, FIG. 8 is a modified embodiment of the present disclosure, and a cross-sectional view illustrating the battery module including a thermally conductive resin-unapplied part 431c formed on the third area 313.

As described above, as the cell stack (not illustrated) is compressed, parts of the thermally conductive resin application layers 400 of the first area 311 and the second area 312 are moved to the third area 313 as illustrated in FIG. 5.

Then, referring to FIG. 8, a part of the thermally conductive resin application layer 400 (see FIG. 5) of the first area 311 may be moved to the third area 313 to form a first thermally conductive resin layer 430ca, and a part of the thermally conductive resin application layer 400 (see FIG. 5) of the second area 312 may be moved to the third area 313 to form a second thermally conductive resin layer 430cb. However, the first thermally conductive resin layer 430ca and the second thermally conductive resin layer 430cb are spaced apart from each other while not contacting each other, so that a thermally conductive resin-unapplied part 431c may be formed.

The thermally conductive resin layers 410c, 420c, 430ca, and 430cb are formed in the same way as the thermally conductive resin is moved due to the compression, but the thermally conductive resins moved from the thermally conductive resin application layer 400 (see FIG. 5) of the first area 311 and the second area 312 do not contact each other, so that the thermally conductive resin-unapplied part 431c may be provided.

That is, according to the present embodiment, the thermally conductive resin layers 430ca and 430cb of the third area 313 may include a first thermally conductive resin layer 430ca that is adjacent to the thermally conductive resin layer 410c of the first area 311 and a second thermally conductive resin layer 430cb that is adjacent to the thermally conductive resin layer 420c of the second area 312. Further, the third area 313 may include a thermally conductive resin-unapplied part 431c located between the first thermally conductive resin layer 430ca and the second thermally conductive resin layer 430cb.

Figure 9:
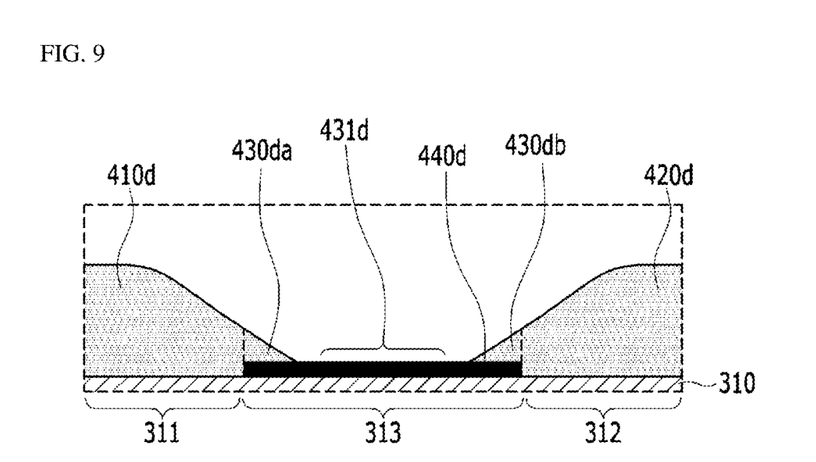
Figure 10:
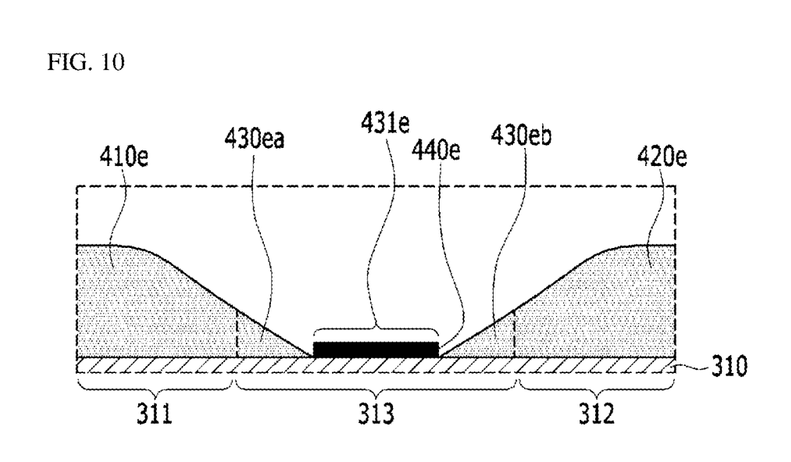

Next, FIGS. 9 and 10 illustrate a modified embodiment of the present disclosure, and are cross-sectional views illustrating insulation films 440d and 440e covering thermally conductive resin-unapplied parts 431d and 431e formed on the third area 313.

First, referring to FIG. 9, the battery module according to a modified embodiment of the present disclosure may further include an insulation film 440d located between at least one of a first thermally conductive resin layer 430da and a second thermally conductive resin layer 430db, and the bottom part 310. That is, only the insulation film 440d located under the first and the second thermally conductive resin layers 430da and 430db is illustrated, but even the insulation film located under one of the first thermally conductive resin layer 430da and the second thermally conductive resin layer 430db may be provided as a modified form.

Next, referring to FIG. 10, the battery module according to a modified embodiment of the present disclosure may further include an insulation film 440e located between a first thermally conductive resin layer 430ea and a second thermally conductive resin layer 430eb. In more detail, one end of the first thermally conductive resin layer 430ea and a left end of the insulation film 440e may contact each other, and one end of the second thermally conductive resin layer 430eb and a right end of the insulation film 440e may contact each other.

The insulation films 440d and 440e may be further disposed on the third area 313 of FIGS. 3 and 5, and a structure of the thermally conductive resin layers 410d, 420d, 430da, and 430db and the insulation film 440d as illustrated in FIG. 9 or a structure of the thermally conductive resin layers 410e, 420e, 430ea, and 430eb and the insulation film 440e as illustrated in FIG. 10 may be formed while the thermally conductive resin application layers 400 applied onto the first area 311 and the second area 312 are moved to the top or opposite sides of the insulation film.

In more detail, in the structure illustrated in FIG. 9, a part of the thermally conductive resin application layer 400 (see FIG. 5) of the first area 311 may be moved to the third area 313 to form the first thermally conductive resin layer 430da on the insulation film 440d, and a part of the thermally conductive resin application layer 400 (see FIG. 5) of the second area 312 may be moved to the third area 313 to form the second thermally conductive resin layer 430db on the insulation film 440d. The first thermally conductive resin layer 430da and the second thermally conductive resin layer 430db may be spaced apart from each other while not contacting each other.

That is, the thermally conductive resin layers 430da and 430db of the third area 313 may include a first thermally conductive resin layer 430da that is adjacent to the thermally conductive resin layer 410d of the first area 311 and a second thermally conductive resin layer 430db that is adjacent to the thermally conductive resin layer 420d of the second area 312. Further, at least one of the first thermally conductive resin layer 430da and the second thermally conductive resin layer 430db, which are spaced apart from each other on the insulation film 440d, may be located.

Unlike this, in the structure illustrated in FIG. 10, the transverse width of the insulation film 440e may be relatively narrowly formed by calculating a degree of movement and an amount of movement of the thermally conductive resin application layer 400 (see FIG. 5). Accordingly, a part of the thermally conductive resin application layer 400 (see FIG. 5) of the first area 311 and a part of the thermally conductive resin application layer 400 (see FIG. 5) of the second area 312 are not moved to the top of the insulation film 440e but moved to a left end and a right end of the insulation film 440e, respectively, when being moved to the third area 313.

The insulation films 440d and 440e illustrated in FIGS. 9 and 10 may cover the thermally conductive resin-unapplied parts 431d and 431e formed on the third area 313. The insulation films 440d and 440e may prevent a current from flowing between the battery cell (not illustrated) and the bottom part 310 through the thermally conductive resin-unapplied parts 431d and 431e. If the insulation films 440d and 440e correspond to an electrically insulating thin film as described above, the shape and the material thereof are not limited.

The one or more battery modules according to the above-mentioned embodiment may be mounted together with various control and protection systems such as battery management system (BMS) and a cooling system to form a battery pack.

The battery module or the battery pack may be applied to various devices. In detail, the battery module or the battery pack may be applied to transportation means such as an electric bike, an electric vehicle, and a hybrid electric vehicle, and may be applied to various devices using a secondary battery, without being limited thereto.

The terms representing directions such as the front side, the rear side, the left side, the right side, the upper side, and the lower side have been used in the present embodiment, but the terms used are provided simply for convenience of description and may become different according to the location of an object or an observer.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery module
200: cell stack
300: module frame
310: bottom part
311: first area
312: second area
313: third area
400: thermally conductive resin application layers

The invention claimed is:
1. A battery module comprising:
a cell stack including a plurality of battery cells; and
a module frame accommodating the cell stack,
wherein a bottom part of the module frame comprises a first area, a second area, and a third area in which respective thermally conductive resin layers are formed, wherein the bottom part has a planar top surface facing the cell stack, and
wherein the thermally conductive resin layers of the first area and the second area extend to a higher point above the planar top surface of the bottom part than the thermally conductive resin layer of the third area, wherein the first area and the second area are located at opposite ends spaced apart from each other in the bottom part of the module frame, wherein the third area is located between the first area and the second area that are spaced apart from each other, and wherein the battery cells have electrode leads, and the first area, the third area, and the second area are arranged sequentially along a direction parallel to a direction in which the electrode leads protrude from the battery cell.

2. The battery module of claim 1, wherein the thermally conductive resin layer of the third area comprises a first thermally conductive resin layer that is adjacent to the thermally conductive resin layer of the first area, and a second thermally conductive resin layer that is adjacent to the thermally conductive resin layer of the second area, and wherein the third area comprises a thermally conductive resin-unapplied part located between the first thermally conductive resin layer and the second thermally conductive resin layer.

3. The battery module of claim 2, further comprising: an insulation film covering the thermally conductive resin-unapplied part.

4. The battery module of claim 2, further comprising: an insulation film located between at least one of the first thermally conductive resin layer and the second thermally conductive resin layer, and the bottom part.

5. The battery module of claim 2, further comprising: an insulation film located between the first thermally conductive resin layer and the second thermally conductive resin layer.

6. The battery module of claim 1, wherein a front surface and a rear surface of the module frame are opened, and the first area and the second area are located at opposite ends of the bottom part, which are adjacent to the front surface and the rear surface, respectively.

7. The battery module of claim 6, wherein the electrode leads of the plurality of battery cells protrude toward the front surface and the rear surface.

8. The battery module of claim 1, wherein the thermally conductive resin layer of the third area comprises a first thermally conductive resin layer that is adjacent to the thermally conductive resin layer of the first area, and the battery module further comprises an insulation film located between the first thermally conductive resin layer of the third area and the bottom part.

9. The battery module of claim 1, wherein a stack direction of the plurality of battery cells is parallel to the bottom part of the module frame, and each battery cell of the plurality of battery cells contacts the thermally conductive resin layer.

10. The battery module of claim 1, wherein the module frame has a U shape, of which an upper part is opened, and the battery module further comprises an upper plate covering the cell stack in the upper part of the module frame.

11. The battery module of claim 10, wherein the module frame further comprises two side surface parts extending upwards from opposite side surfaces of the bottom part, which face each other, and a distance between the two side surface parts is the same as a width of the upper plate.

12. A battery pack comprising one or more of the battery modules of claim 1.

13. The battery module of claim 1, wherein the respective thermally conductive resin layers extend only from the planar top surface of the bottom part toward the cell stack, and wherein the planar top surface of the bottom part is a flat plate.

14. The battery module of claim 1, wherein a thickness of the thermally conductive resin layers of the first area and the second area are each greater than a thickness of the thermally conductive resin layer of the third area, wherein a distance between a lowest point of the thermally conductive resin layer of the first area and the bottom part is greater than a distance of a highest point of the thermally conductive resin layer of the third area and the bottom part, and wherein a distance between a lowest point of the thermally conductive resin layer of the second area and the bottom part is greater than a distance between a highest point of the thermally conductive resin layer of the third area and the bottom part.

\* \* \* \* \*